(12) United States Patent
Dempster

(10) Patent No.: US 8,690,477 B2
(45) Date of Patent: Apr. 8, 2014

(54) SYSTEM AND METHOD FOR GENERATING ENERGY FROM SUBSURFACE WATER CURRENTS

(76) Inventor: Harry Edward Dempster, Newbury Park, CA (US)

( * ) Notice: Subject to any disclaimer, the term of this patent is extended or adjusted under 35 U.S.C. 154(b) by 1822 days.

(21) Appl. No.: 11/554,587

(22) Filed: Oct. 31, 2006

(65) Prior Publication Data

US 2007/0108768 A1    May 17, 2007

Related U.S. Application Data

(60) Provisional application No. 60/731,584, filed on Oct. 31, 2005.

(51) Int. Cl.
    *E02B 9/00* (2006.01)
(52) U.S. Cl.
    USPC .................................. 405/76; 405/75; 290/54
(58) Field of Classification Search
    USPC .................................. 405/75–76; 290/53–54
    See application file for complete search history.

(56) References Cited

U.S. PATENT DOCUMENTS

| | | | | |
|---|---|---|---|---|
| 3,541,588 A | * | 11/1970 | Ragland | 141/1 |
| 3,934,528 A | * | 1/1976 | Horton et al. | 114/296 |
| 4,290,381 A | * | 9/1981 | Penman | 114/263 |
| 4,717,831 A | * | 1/1988 | Kikuchi | 290/53 |
| 4,850,190 A | | 7/1989 | Pitts | |
| 6,291,904 B1 | | 9/2001 | Carroll | |
| 6,759,757 B1 | | 7/2004 | Campbell | |
| 7,352,074 B1 | * | 4/2008 | Pas | 290/43 |
| 2002/0145288 A1 | | 10/2002 | Van Breems | |

FOREIGN PATENT DOCUMENTS

| | | |
|---|---|---|
| CA | 2421139 | 9/2004 |
| GB | 2 348 249 | 9/2000 |
| WO | WO 02/093715 A1 | 11/2002 |
| WO | WO 2005035977 | 4/2005 |

OTHER PUBLICATIONS

International Search Report and Written Opinion of the International Searching Authority for PCT/US06/60377, which corresponds to the present application. Oct. 2007.
Search report from European Patent Office in corresponding European patent application EP 06 839 626.

* cited by examiner

*Primary Examiner* — David Bagnell
(74) *Attorney, Agent, or Firm* — Joseph G. Swan, P.C.

(57) ABSTRACT

Provided are, among other things, systems, methods and techniques for generating energy. According to one representative embodiment, a main housing includes an air chamber having an open bottom, and a paddlewheel is attached to the main housing so that the paddlewheel is free to rotate and thereby generate kinetic energy. An anchor is attached to the main housing, and an electrical generator which converts the kinetic energy of the paddlewheel into electrical energy is coupled to the paddlewheel. An upper portion of the paddlewheel is enclosed by the air chamber. When the main housing is submerged underwater and maintained in a level orientation, air within the air chamber remains trapped within the air chamber, thereby reducing resistance to rotation of the paddlewheel.

19 Claims, 8 Drawing Sheets

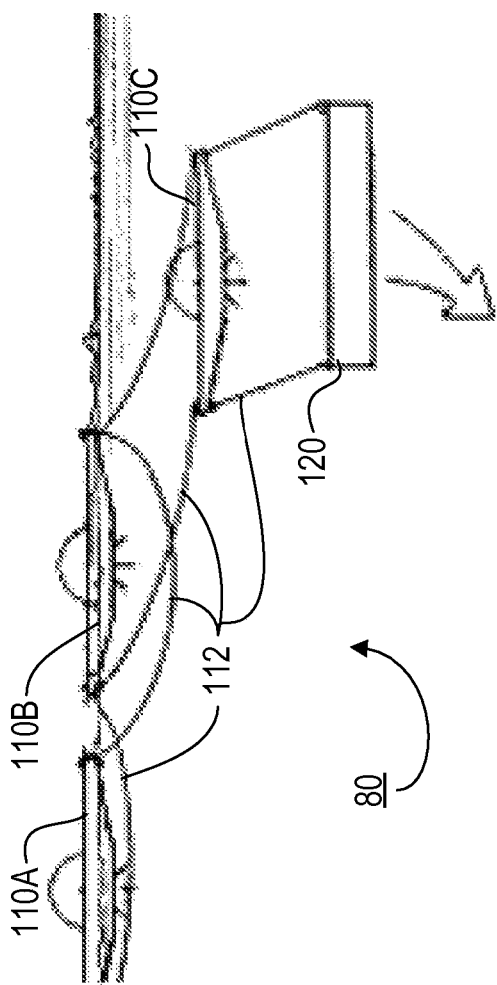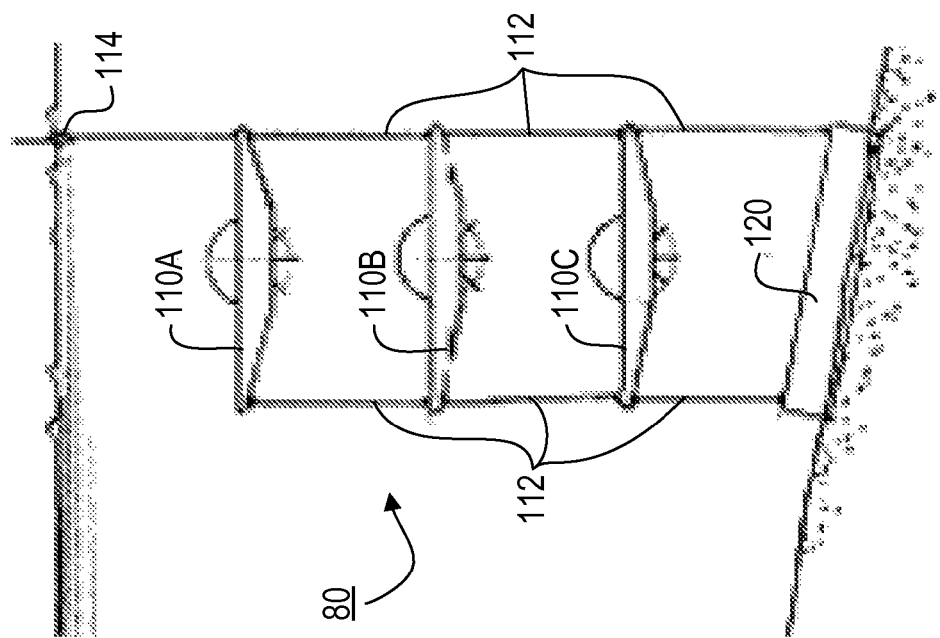
FIG. 5
FIG. 6

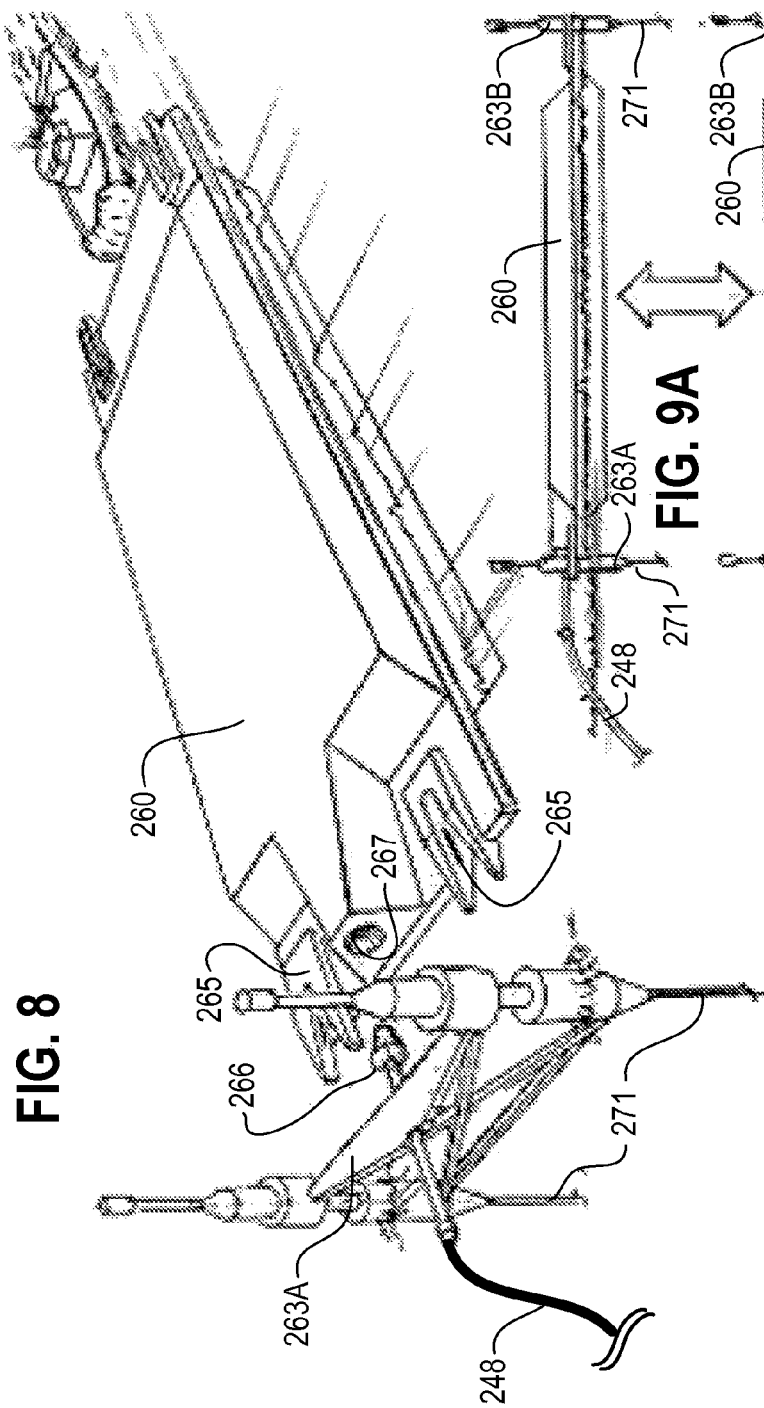
FIG. 8
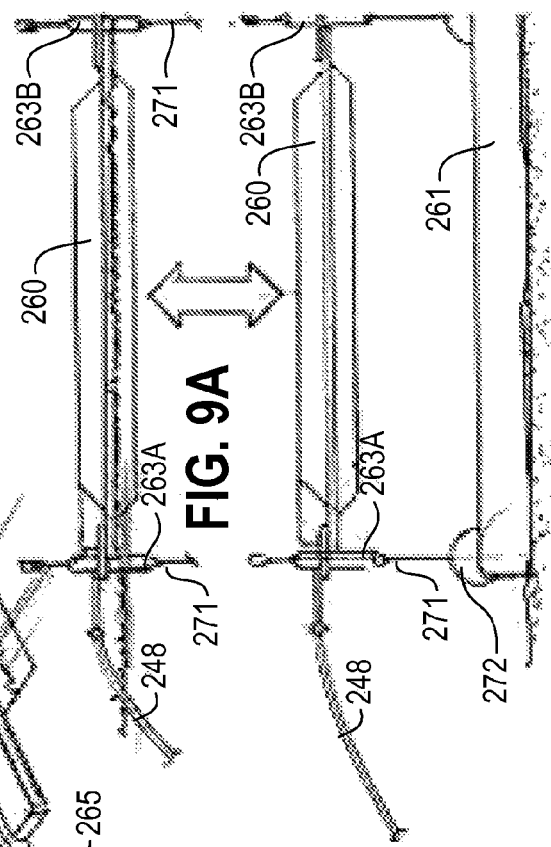
FIG. 9A
FIG. 9B

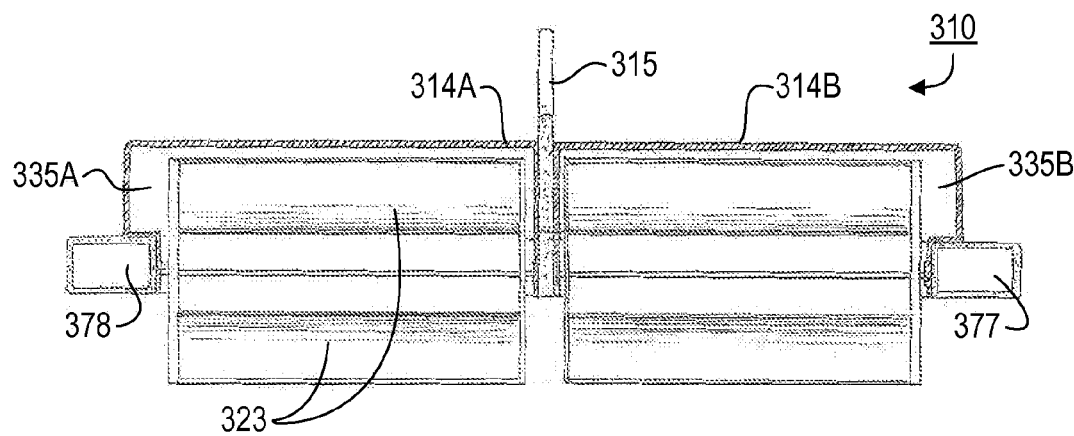
FIG. 12
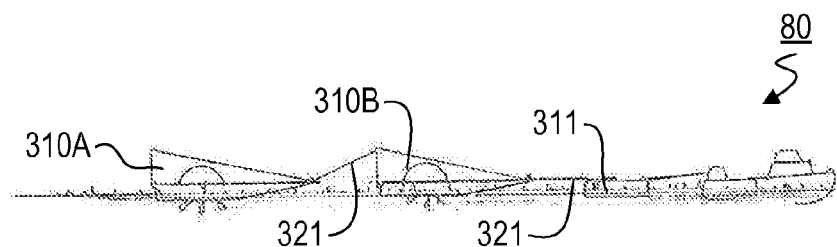
FIG. 13
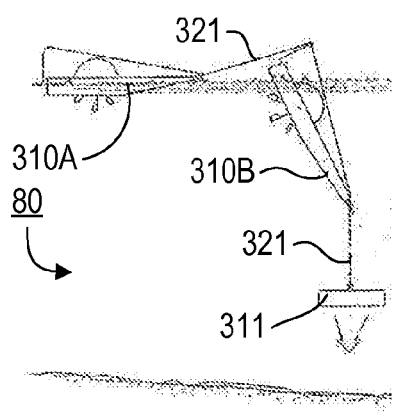 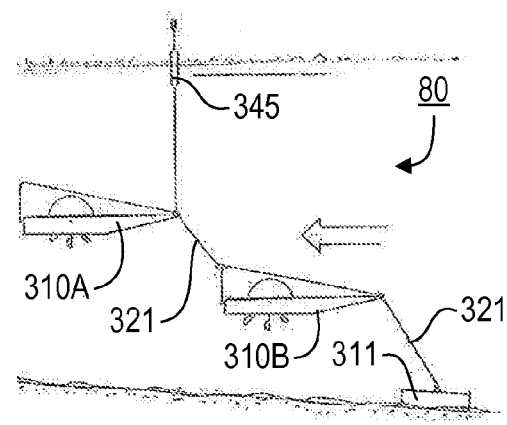
FIG. 14    FIG. 15

SYSTEM AND METHOD FOR GENERATING ENERGY FROM SUBSURFACE WATER CURRENTS

This application claims the benefit of U.S. Provisional Patent Application Ser. No. 60/731,584, filed on Oct. 31, 2005, and titled "Ocean Tide and Current Energy Collection and Transport System", which application is incorporated by reference herein as though set forth herein in full.

FIELD OF THE INVENTION

The present invention pertains to systems, methods and techniques for generating energy, e.g., electrical energy, from underwater currents.

BACKGROUND

In many areas of the world, the need for energy and/or energy dependence are critical concerns. In an attempt to address these problems, a great deal of effort has been focused on clean renewable energy generation. However, each of the conventional approaches has its own drawbacks, resulting in an ongoing need for better energy-generation solutions.

SUMMARY OF THE INVENTION

Provided are systems, methods and techniques for generating energy. According to one representative embodiment, a main housing includes an air chamber having an open bottom, and a paddlewheel is attached to the main housing so that the paddlewheel is free to rotate and thereby generate kinetic energy. An anchor is attached to the main housing, and an electrical generator which converts the kinetic energy of the paddlewheel into electrical energy is coupled to the paddlewheel. An upper portion of the paddlewheel is enclosed by the air chamber. When the main housing is submerged underwater and maintained in a level orientation, air within the air chamber remains trapped within the air chamber, thereby reducing resistance to rotation of the paddlewheel.

According to another embodiment, the invention is directed to a system for generating energy in which rotational means rotate in response to a water current, thereby generating kinetic energy. Flow differential means reduces flow of the water current across a portion of the rotational means, and conversion means converts the kinetic energy into a different form of energy. The rotational means, flow differential means and conversion means are disposed underwater.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 5 illustrates a side elevational view of the deployment of an energy-generation system according to a first representative embodiment of the present invention.

FIG. 6 illustrates a side elevational view of an energy-generation system after full deployment according to a first representative embodiment of the present invention.

FIG. 8 is a perspective view of a hydrogen storage/transport barge and mooring buoy according to a second representative embodiment of the present invention.

FIG. 9A is a side elevational view of a storage/transport barge on the surface of the water, and FIG. 9B is a side elevational view of the barge below the wave action in an operational mode, according to a second representative embodiment of the present invention.

FIG. 12 is a front cross-sectional view of an energy-generating unit according to a third representative embodiment of the present invention.

FIG. 13 depicts a side elevational view of a series of energy-generating units attached to a variable-displacement anchor under tow, according to a third representative embodiment of the present invention.

FIG. 14 illustrates a side elevational view of the deployment of an energy-generation system according to a third representative embodiment of the present invention.

FIG. 15 illustrates a side elevational view of an energy-generation system after full deployment according to a third representative embodiment of the present invention.

DESCRIPTION OF THE PREFERRED EMBODIMENT(S)

The present disclosure is related to U.S. Pat. No. 6,935,808 to the present inventor, titled "Breakwater" (the '808 patent), U.S. Pat. No. 6,860,219 to the present inventor, titled "Technique and Platform for Fabricating a Variable-Buoyancy Structure" (the '219 patent) and pending U.S. patent application Ser. No. 10/685,832 which was filed by the present inventor on Oct. 14, 2003, and is titled, "Water-Based Wind-Driven Power Generation Using a Submerged Platform" (the '832 application), which patents and applications are incorporated by reference herein as though set forth herein in full.

Figure 1:
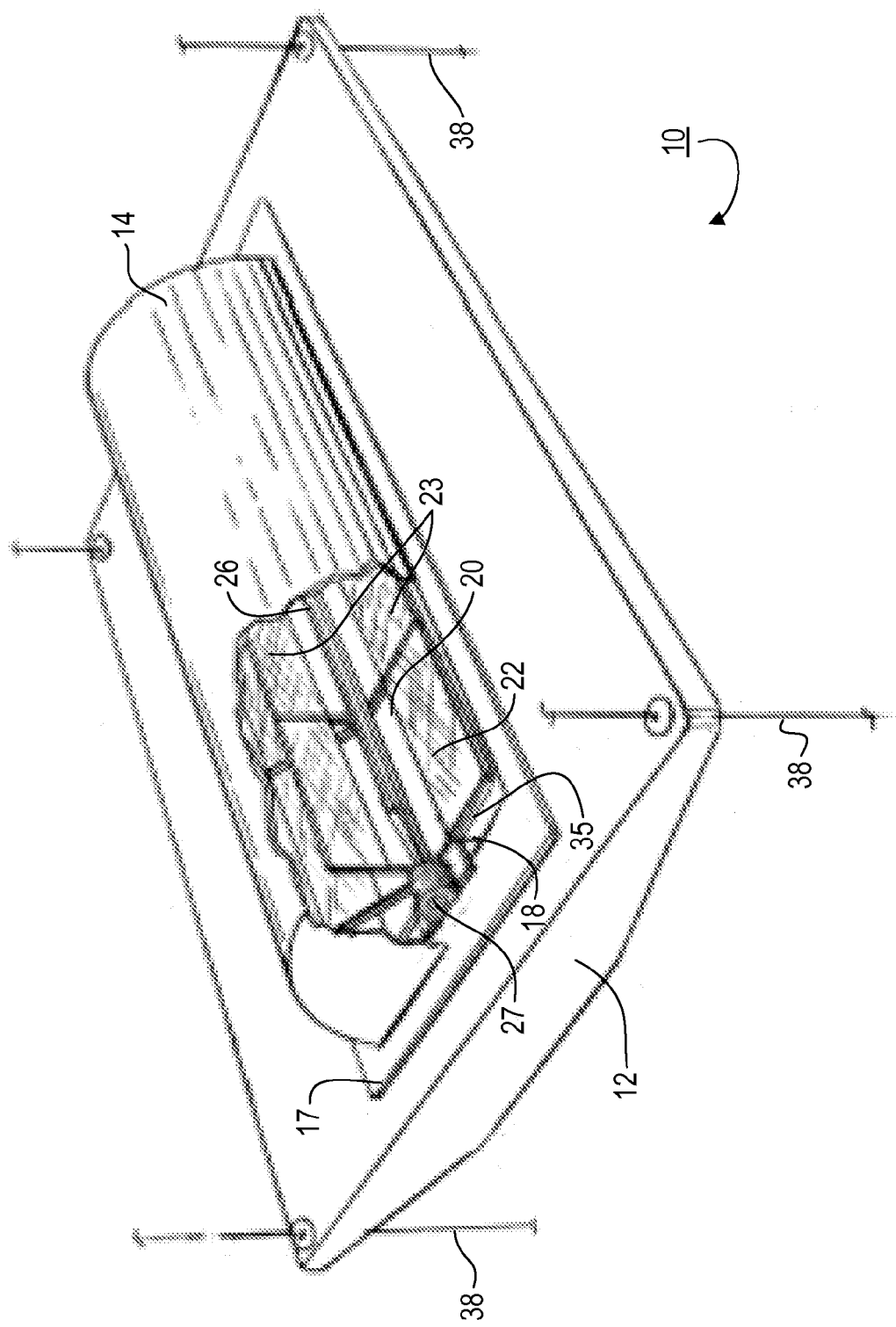
FIG. 1 shows a perspective partial-cutaway view of an energy-generating unit according to a first representative embodiment of the present invention.
Figure 2:
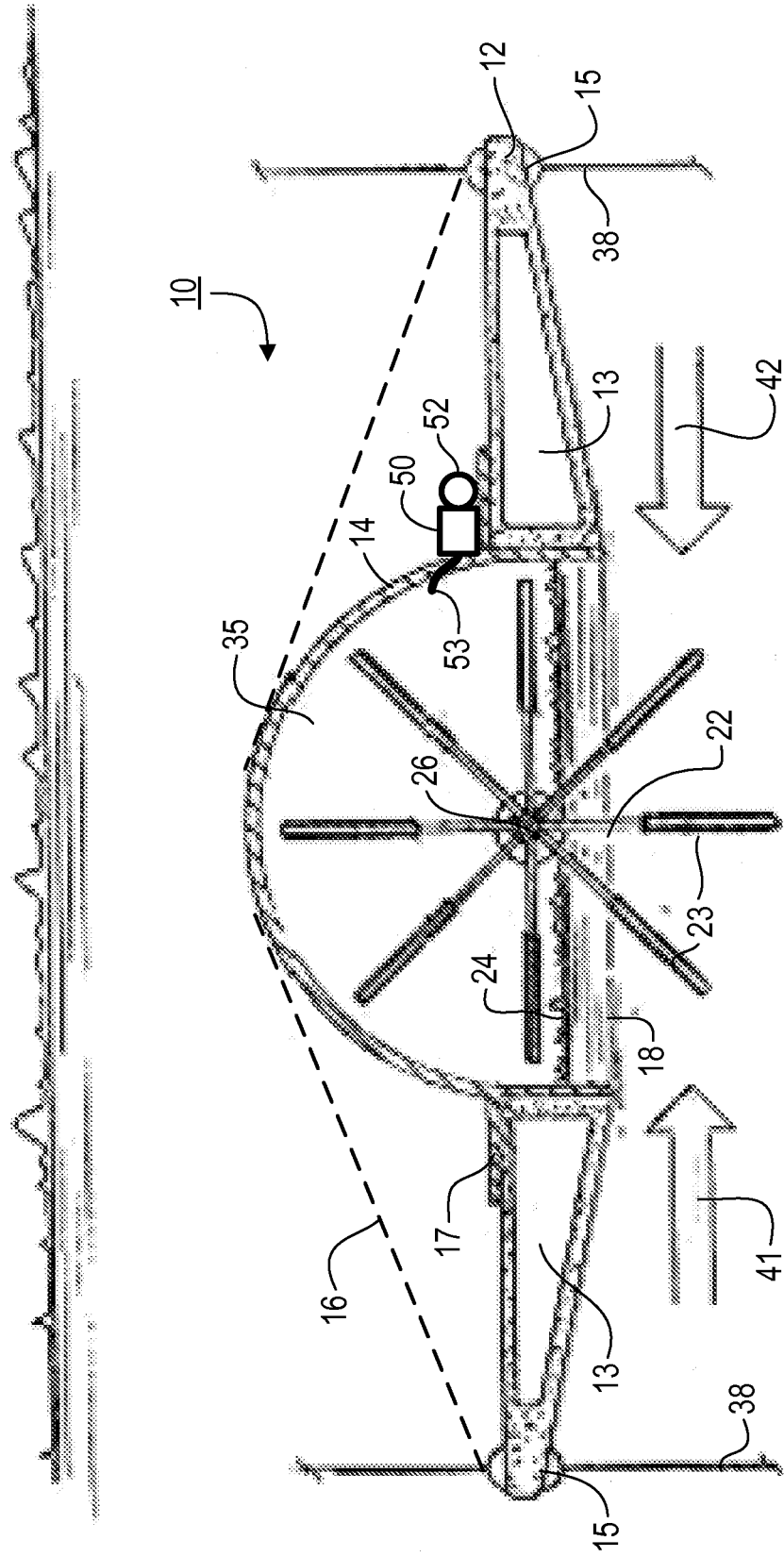
FIG. 2 is a side cross-sectional view of an energy-generating unit in use, according to a first representative embodiment of the present invention.
Figure 3:
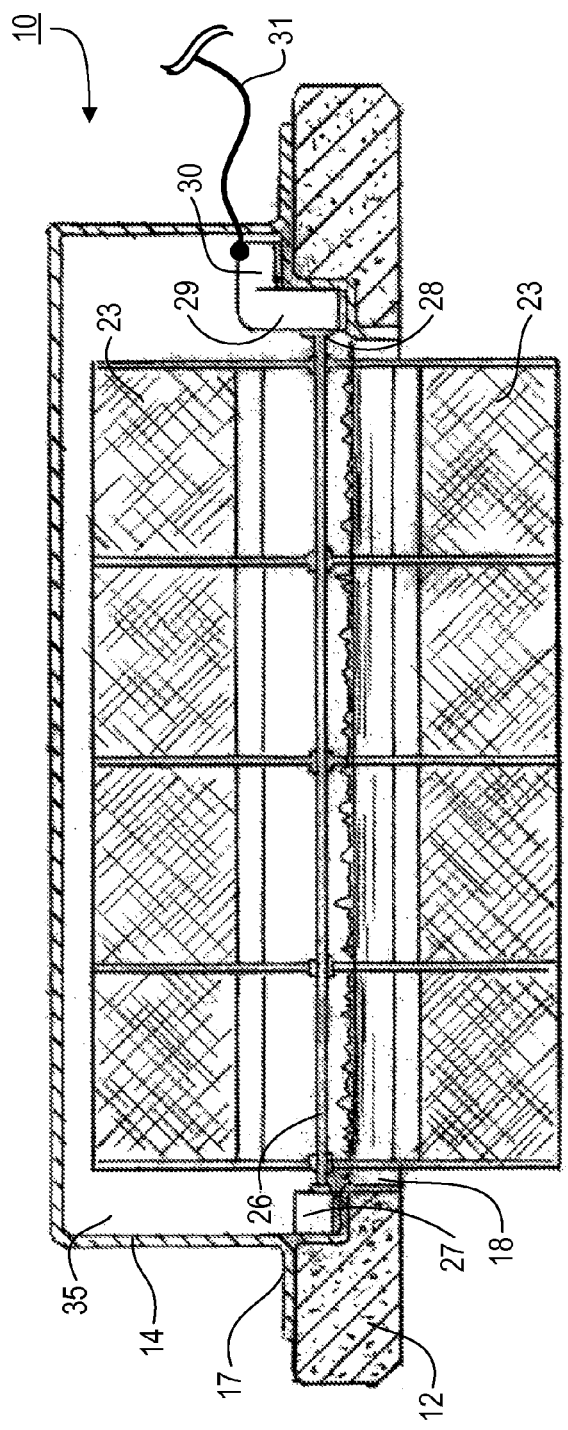
FIG. 3 is a front cross-sectional view of an energy-generating unit according to a first representative embodiment of the present invention.

FIG. 1 shows a cutaway perspective view, FIG. 2 shows a side cross-sectional view and FIG. 3 shows a front cross-sectional view of an energy-generating unit 10, according to a first representative embodiment of the present invention. Energy-generating unit 10 includes an outer main housing 12 that supports a cover 14 which, in turn, encloses the top portion of a paddlewheel assembly 20.

In the present embodiment, main housing 12 is implemented as a variable-displacement concrete barge, although other structures instead may be used in other embodiments of the invention. However, in the preferred embodiments main housing 12 provides variable buoyancy, allowing the entire structure 10 to be sunk beneath the water's surface and then re-floated as desired. In addition, main housing 12 preferably is large, massive and stable enough to maintain a relatively horizontal orientation (for reasons that will become apparent below) in the expected underwater conditions.

In representative embodiments of the invention, energy-generating unit 10 has a minimum weight of 200-300 pounds, and can extend up to several hundred feet long and weigh thousands of tons. The weight for any particular embodiment preferably depends upon the expected environment and the desired energy output. In addition to sheer mass, maintaining a stable orientation generally also will depend upon providing good balance.

For these purposes, main housing 12 includes front and rear ballast tanks 13. The amount of water into each ballast tank 13 preferably is controlled so as to maintain main housing 12 in a horizontal orientation (e.g., using a control system as described in the '219 patent). Although not shown, similar ballast tanks 13 preferably are provided for the same purpose on the left and right sides of main housing 12.

In addition, main housing 12 preferably includes cable attachment/locking hardware 15 for attaching a cable or other tethering device 38, which in turn attaches to an anchor. In the preferred embodiments, hardware 15 includes a swivel device which permits rotation in two orthogonal planes (e.g., horizontal and vertical). As a result, the attachment hardware 15 allows main housing 12 to move closer to or farther away from the attached anchor, as well as moving from side to side. Such freedom of motion can allow main housing 12 to properly orient itself to changing current directions. It is noted that similar attachment hardware 15 may be used on the top surface of main housing 12, with cables 38 extending therefrom, e.g., where another similar energy-generating unit 10 is to be floated immediately above the present energy-generating unit 10.

Paddlewheel assembly 20 is disposed within a central opening 18 of main housing 12 and includes a paddlewheel 22 which, in turn, is made up of a number of radially extending paddles 23 (eight such paddles in the present embodiment). In the present embodiment, paddles 23 are substantially flat, allowing paddlewheel 22 to respond equivalently to front-to-rear current flows 41 and rear-to-front current flows 42. However, in other embodiments differently shaped paddles 23 are used, e.g., as discussed below. In any event, paddlewheel 22 is free to rotate about a central axle 26 which, in turn, is attached at each end to a side edge of opening 18.

More specifically, axle 26 preferably is held in place by bearing housings 27 and 28. The axle 26 continues through bearing housing 28 to a transmission system 29. The transmission system 29, in turn, carries the rotational energy of the paddlewheel 22 to electrical generator 30. The generated electricity preferably is fed through a transport cable 31 that extends to an electrical grid (not shown), to a subsurface hydrogen production barge, or to any other subsurface processing station (as discussed in more detail below). However, in alternate embodiments the generated electricity is used or stored within energy-generating unit 10 itself.

Cover 14 preferably has a dome-shaped cross section and is made of plastic, although various other shapes and/or materials instead may be used. In any event, cover 14 preferably is capable of withstanding external water pressures of at least 2-3 atmospheres (based on the expected depth at which energy-generating unit 10 will be used) and is shaped to reduce effective resistance to water flow. For the latter purpose, rather then using a simple dome-shaped cover 14 that matches the upper contour of paddlewheel assembly 20, a more tapered shape 16 that provide less resistance to water flow is used in certain embodiments of the invention.

In any event, cover 14 provides an air chamber 35, which is enclosed at the top by cover 14 and is open at the bottom, the bottom opening being where the lower portion of the paddlewheel assembly 20 extends through. As a result, when the entire energy-generating unit 10 is submerged in water and oriented in a horizontal position, air remains trapped within the air chamber 35, thereby of allowing the paddlewheel to turn underwater with little resistance.

For this purpose, in the present embodiment the cover 14 is airtight and is attached to the main housing 12 at flange 17. In addition, the sides of cover 14 continue down through the central opening 18 of main housing 12 to the water level 24, or to below water level 24, in order to form an airtight enclosure. Of course, the water level 24 generally will be determined by the relationship of the air pressure within chamber 35 to the outside water pressure. Accordingly, as shown in FIG. 2, the sides of cover 14 continue to the bottom of main housing 12.

In the present embodiment, air chamber 35 is pressurized using an air pump and/or regulator 50 that brings in air (broadly intended to refer to any gas) from one or more onboard storage tanks 52 and transport it into air chamber 35 via hose and nozzle assembly 53. However, in alternate embodiments of the invention, air is brought in from the surface, e.g., via a connection to a floating buoy, or from one or more tanks disposed on a separate component of the system. As a result, any air lost (e.g., due to leakage or as a result of main housing 12 tilting) preferably automatically is replaced, and air chamber 35 preferably is maintained at a constant air pressure, or at least within a desired range of air pressures.

In this way, water flow across the bottom portion of the paddlewheel 22 causes of paddlewheel 22 to rotate, providing kinetic energy. As noted above, such kinetic energy preferably is passed through a transmission 29 to an onboard electrical generator 30, thereby providing consistent electrical power generation.

Energy-generating unit 10 preferably is held in place below the wave action by a large re-floatable concrete anchoring system (e.g., as disclosed in the '219 patent) that facilitates the rapid deployment or recovery of the whole system. The use and deployment of such an anchoring system are described in more detail below. However, it should be noted that any other type of anchor that is capable of withstanding the expected forces of the water current can be used.

Figure 4:
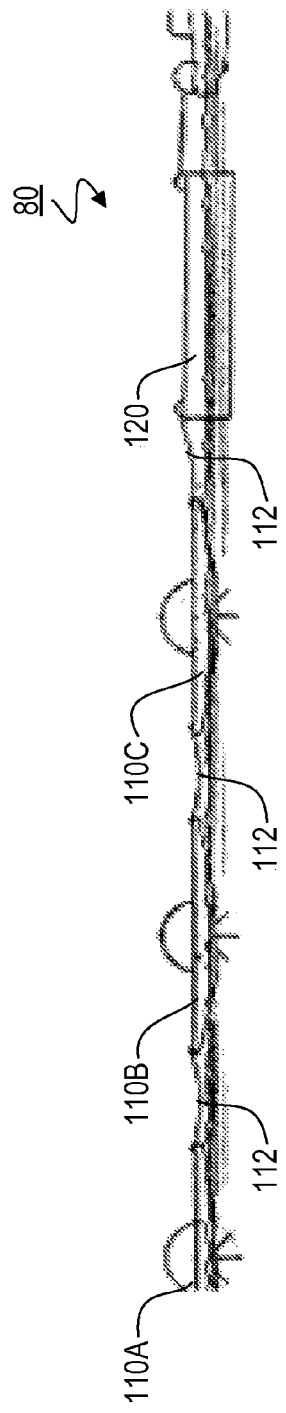
FIG. 4 depicts a side elevational view of a series of energy-generating units attached to a variable-displacement anchor under tow, according to a first representative embodiment of the present invention.

In the preferred embodiments, energy-generating unit 10 is part of an overall energy-generation system that includes an anchor and may include additional energy-conversion and/or energy-storage components and/or may include additional energy-generating units 10. Deployment of an exemplary system 80 is illustrated in FIGS. 4-6. As shown, system 80 includes three energy-generating units 110A-C (which preferably are identical to energy-generating unit 10, discussed above) and an anchor 120 (which preferably is implemented as a variable-buoyancy concrete structure, e.g., as described in the '219 patent.

Specifically, FIG. 4 depicts a side elevational view of a series of energy-generating units 110A-C attached to a variable-displacement anchor 120 under tow, according to the present embodiment of the present invention. FIG. 5 illustrates deployment of system 80, and FIG. 6 illustrates system 80 after full deployment.

The housings 12 for the individual energy-generating units 110A-C and the anchor 120 preferably are manufactured in and on the water, e.g., using the techniques described in the '219 patent. The cover 14, paddlewheel 22, electrical generator system 30 and anchoring cables 112 for each energy-generating unit 110A-C preferably are installed at the dock to complete such energy-generating units 110A-C. The fully operational system 80 is then towed to a predetermined installation site (as illustrated in FIG. 4) where it is deployed.

At the installation site, air is released from the variable-buoyancy anchor 120. As anchor 120 sinks, air is released from each energy-generating unit 110A-C in turn, causing the entire system 80 to sink (with anchor 120 sinking all the way to the bottom) in a controlled manner. On the way down, the ballast tanks for the individual components (e.g., ballast tanks 13 for energy-generating units 110A-C) preferably are adjusted (e.g., as described in the '219 patent) to ensure that each individual component sinks in a substantially horizontal orientation. The individual energy-generating units 110A-C may be provided with negative buoyancy (in which case they will sink of their own accord) or slight positive buoyancy (in which case they will be pulled down by anchor 120) during the descent.

Once the anchor 120 reaches the bottom and is stabilized there (e.g., as described in the '219 patent), the anchor cables 112 are adjusted to level the components of the system 80, and air is pumped into the energy-generating units 110A-C, thereby pulling the anchor cables 112 taut and stabilizing the system 80. The top energy-generating unit 110A is connected to a buoy 114, e.g., for safety purposes, for supporting a radio antenna, for locating system 80 for maintenance or other purposes, for obtaining air from the surface, for offloading generated fuel, for allowing passing ships and others to easily identify where system 80 has been deployed, and/or for receiving information correct deployment. Generally speaking, this deployment procedure can be accomplished in a matter of a couple of hours. The entire system 80 then can be quickly re-floated for maintenance or relocation by reversing the foregoing deployment procedure.

When it is not cost-effective to cable the generated electricity to shore or store it in batteries (either onboard the energy-generating units 110A-C or in a separate component of the system 80), the generated electrical energy preferably (i) is used to remove hydrogen from the surrounding water, which is then compressed into liquid form and stored in a variable-displacement (variable-buoyancy) transport/storage barge; and/or (ii) is used on-site, e.g., for purifying and storing or otherwise treating the surrounding water. A complete system 200 for providing such energy generation and storage, according to a second representative embodiment of the present invention, is illustrated in FIG. 7.

Figure 7:
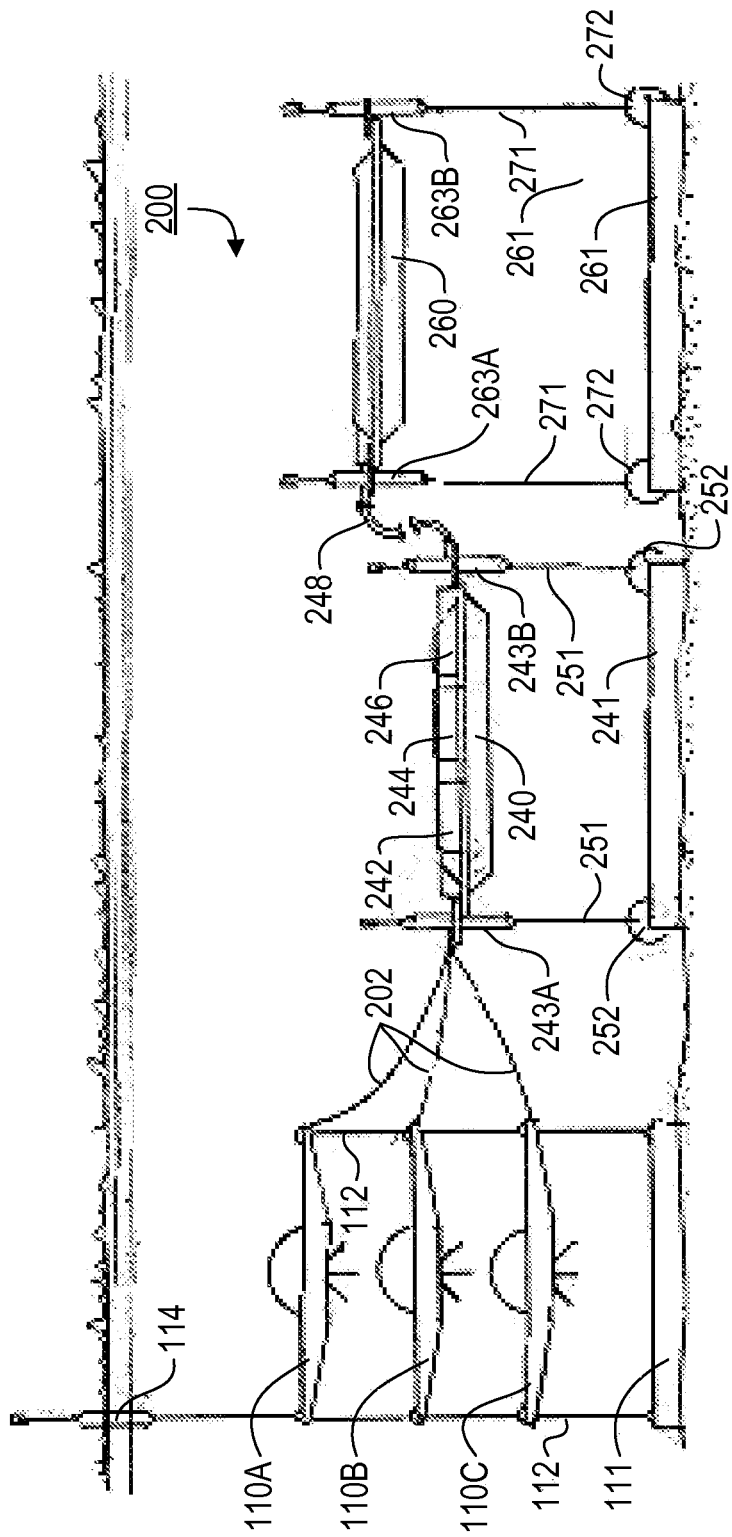
FIG. 7 is a side elevational view of an entire energy-generation system in operational use according to a second representative embodiment of the present invention.

More specifically, FIG. 7 shows a side elevational view of an energy-generation system 200 that includes, in addition to a plurality of energy-generating units 110A-C, one or more sub-surface hydrogen-production barge(s) 240 and a storage/transport barge 260. All three subsystems in their operational mode preferably are moored below the wave action by re-floatable concrete anchors 111, 241 and 261, respectively, which preferably are identical to anchor 120, discussed above.

The production barge 240, is equipped with a hydrogen-production system 244 and a gas-compression system 246 and, optionally, is equipped with a water-purification (e.g., desalinization) system 242. Electricity is transferred from the energy-generating units 110A-C via electrical cables 202 through a terminal located on mooring buoy 243 to the production barge 240. High-pressure hose 248 then transfers the compressed hydrogen to the storage/transport barge 260. The production barge 240 is held in place by anchor lines 251 extending from winches 252 on anchor 241 to mooring attachment buoys 243A&B on production barge 240, and the storage/transport barge 260 is held in place by anchor lines 271 extending from winches 272 on anchor 261 to mooring attachment buoys 263A&B on storage/transport barge 260.

When the storage/transport barge 260 has become filled with hydrogen, air is pumped into the ballast tanks of the storage/transport barge 260. Mooring winches 272 are unlocked and the mooring buoys 263 and gas transfer line 248 rise with the barge 260 to the surface. At the surface, the loaded barge 260 is disconnected from the mooring buoys 263A&B and gas transfer lines 248, which are then reconnected to an empty replacement barge 260. Air is released from the new (empty) barge's ballast tanks, and the new storage barge 260 is winched below the wave action and the public view shed. The loaded barge 260 is then towed to an offshore gas terminal where it is connected to mooring buoys and transfer lines.

A more detailed view of one example of one such transport/storage barge 260 is illustrated in FIGS. 8-9. More specifically, FIG. 8 is a perspective view of a concrete storage/transport barge 260 being pushed toward mooring buoy 263A. The barge 260 is equipped with four mooring devices 265 that attach and lock onto buoys 263. The forward buoy assembly 263A is equipped with a fueling connection 266 that locks onto the barge's gas storage tanks 267.

FIG. 9A is a side elevational view of the storage/transport barge 260 on the surface of the water attached to buoys 263A&B. FIG. 9B shows the barge 260 below the wave action in an operational mode attached to buoys 263A&B, which have been drawn below the ocean surface by mooring cables 271, which in turn are attached to winches 272 that are mounted aboard the variable-displacement concrete anchor 261.

Figure 10:
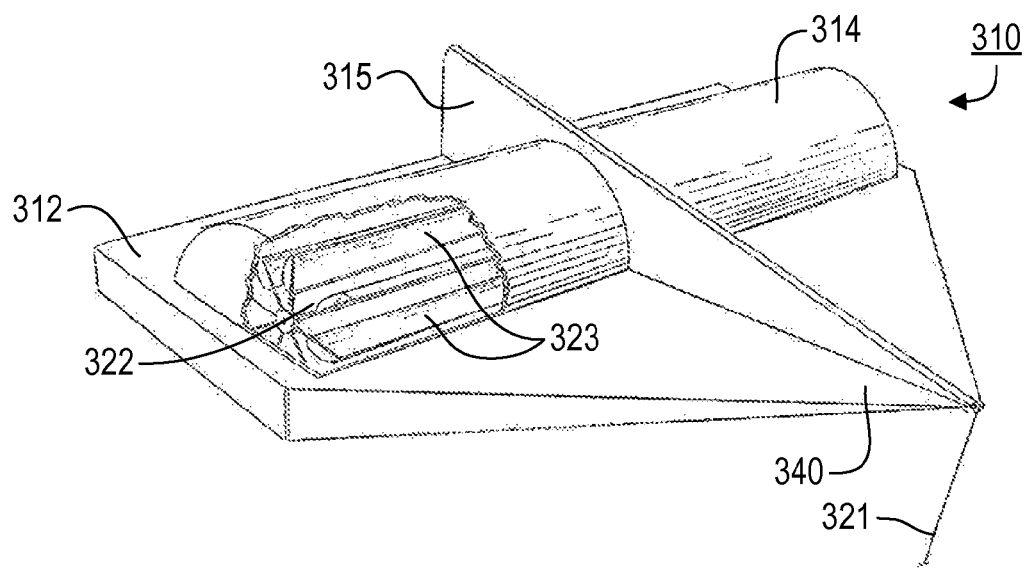
FIG. 10 shows a perspective partial-cutaway view of an energy-generating unit according to a third representative embodiment of the present invention.
Figure 11:
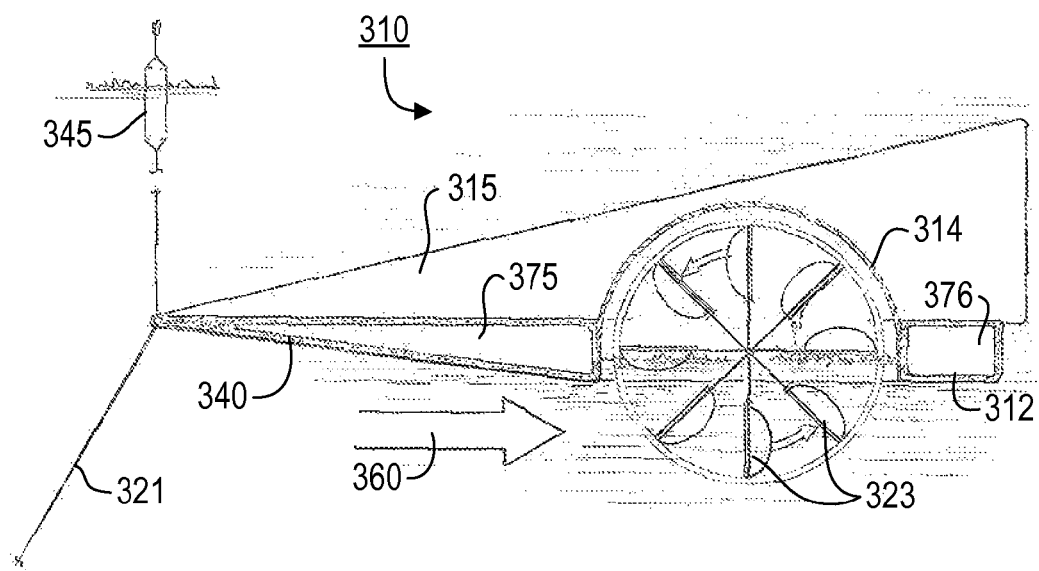
FIG. 11 is a side cross-sectional view of an energy-generating unit in use, according to a third representative embodiment of the present invention.

FIGS. 10-12 illustrate a modified energy-generating unit 310 according to a third representative embodiment of the present invention. As shown, the main differences between energy-generating unit 310 and energy-generating unit 110 are that: (i) energy-generating unit 310 has been provided with a triangular-shaped fixed rudder 315 down the middle of the top surface, resulting in two separate covers the 314A and 314B, as well as two separate air chambers 335A in the 335B; (ii) the individual paddles 323 on the paddlewheel 322 for energy-generating unit 310 have a concave shape; (iii) the main housing 312 for energy-generating unit 310 has a wedge-shaped front end 340; and (iv) the anchor cable 321 is attached at only a single point on the front end 340 of energy-generating unit 310. In an alternate embodiment, only a single cover and air chamber are provided, with rudder 315 having a cutout portion that follows the contour of the cover.

As a result of these differences, particularly the provision of rudder 315, energy-generating unit 310 typically is better able to orient itself to the direction of the current flow than is energy-generating unit 110. Because of this, the paddles 323 can be shaped in a manner so as to provide maximum efficiency with respect to unidirectional flow 360. For purposes of maintaining proper orientation, energy-generating unit 310 is provided with the foreword, rear, left and right and ballast tanks 375-378, respectively, into which the amount of water may be independently controlled.

FIGS. 13-15 illustrate the deployment sequence of a system 380 comprising a number of energy-generating units 310A and 310B and a variable-buoyancy anchor 311 according to a representative embodiment of the present invention. Preferably, anchor 311 is configured in the same way as anchor 120, described above. Initially, FIG. 13 shows the system 380 being towed to the intended use site.

FIG. 14 then illustrates the beginning of the deployment of system 80 at the use site. As shown, air is first released from the ballast tanks of anchor 311, causing it to sink and pulling down each of energy-generating units 310A-310B in turn. Because the anchor cable 321 is attached only to the front end 340 of each such energy-generating unit 310A-310B, each is pulled down in a more vertical orientation. A natural result is the flooding of their respective air chambers 335.

In FIG. 15, anchor 311 has settled on the bottom and air has been pumped into the air chambers 335, resulting in the illustrated configuration. In the preferred embodiments, at least one of the energy-generating units 310A-310B is attached to a buoy 345, e.g., for safety purposes, for supporting a radio antenna, for locating system 380 for maintenance or other purposes, for obtaining air from the surface, and/or for offloading generated fuel.

The foregoing discussion describes several representative embodiments of the present invention. Generally speaking, in such embodiments a paddlewheel 22 is used to convert water flow into rotational kinetic energy, which is then converted into electrical energy. A number of variations are possible on this general structure.

For instance, the embodiments described above use a cover 14 to form an air chamber 35 having an open bottom. Air chamber 35 provides two desirable features. First, it creates a flow differential across paddlewheel 22, in which the bottom portion of paddlewheel 22 is exposed to the current flow but the top portion is shielded from such flow by cover 14. This differential flow results in the rotational motion discussed above. Lacking such a differential flow, both the top and bottom of paddlewheel 22 would be subject to roughly the same forces, resulting in very little if any rotation. It should be noted that a variety of other techniques may be used to achieve differential flow, such as a foil to redirect water flow away from one portion of the paddlewheel 22. Another purpose of air chamber 35 is to eliminate water resistance across at least a portion of the paddlewheel 22, e.g., in the embodiments described above, across essentially the entire portion of paddlewheel 22 that has been shielded from water flow.

In addition, in further embodiments, (i) paddlewheel 22 is replaced with any other type of device that rotates in response to water current, such as one or more turbines or propeller-shaped structures; (ii) the anchors described above are replaced with any other anchor structure that is capable of inhibiting lateral motion of the energy-generating unit 10 due to the water current, e.g., structures permanently attached to the bottom or even sufficiently massive floating structures; and (iii) the electrical generator 30 and/or hydrogen-production system 244 described above are replaced with any other apparatus for converting the kinetic energy produced by paddlewheel 22 (or similar structure) into a different form of energy, e.g., chemical, stored kinetic or extraction of deuterium from ocean water.

In addition, the generated energy may be stored and (e.g., as discussed above), may be used onsite, or any combination of the two. One use already noted above is for a desalinization purposes. Another is to power instruments for ecological purposes (e.g., water purification or decontamination) or for scientific study (e.g., ocean sensors and transmission of the resulting data using buoy-mounted transmitters and antennas).

Additional Considerations

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A system for generating energy, comprising:
    a main housing;
    a rotating member attached to the main housing that rotates in response to water current, thereby generating kinetic energy;
    an anchor attached to the main housing; and
    an electrical generator, coupled to the rotating member, which converts the kinetic energy of the rotating member into electrical energy,
    wherein the main housing is submerged underwater and movably tethered to the anchor, and
    wherein each of the main housing and the anchor has variable buoyancy, permitting sinking and then refloating as desired.

2. A system according to claim 1, wherein the main housing includes a rudder, whereby when the main housing and attached rotating member are disposed in a water current, the rudder automatically adjusts a position of the main housing so that the rotating member is directly facing the water current.

3. A system according to claim 1, further comprising an underwater hydrogen-generation system, coupled to the electrical generator, which uses the generated electrical energy to produce hydrogen from water, and an underwater hydrogen-storage tank.

4. A system according to claim 1, wherein the rotating member comprises a paddlewheel that is horizontally oriented when in use.

5. A system according to claim 1, further comprising a second energy-generating unit that includes a second housing and a second rotating member and that is movably tethered to the housing, and wherein the second energy-generating unit has variable buoyancy, permitting sinking and then refloating as desired.

6. A system according to claim 1, wherein each of the main housing and the anchor is made of concrete.

7. A method of generating energy, comprising:
    towing an energy-generating unit and an anchor to an installation site, the energy-generating unit including a main housing, a rotating member attached to the main housing that rotates in response to water current, thereby generating kinetic energy, and an electrical generator, coupled to the rotating member, which converts the kinetic energy of the rotating member into electrical energy;
    attaching the energy-generating unit to the anchor;

releasing air from the anchor, thereby sinking the anchor; and releasing air from the energy-generating unit, thereby sinking the energy-generating unit, wherein upon completion of sinking the anchor and the energy-generating unit, the energy-generating unit is submerged underwater and movably tethered to the anchor, and wherein each of the energy-generating unit and the anchor has variable buoyancy, permitting sinking and then refloating as desired.

8. A method according to claim 7, further comprising a step of manufacturing the energy-generating unit and the anchor in and on the water prior to said towing step.

9. A method according to claim 7, wherein the energy-generating unit is tethered to the anchor using at least one anchor cable, and further comprising a step of adjusting the at least one anchor cable after the anchor reaches the bottom of the water.

10. A method according to claim 9, wherein said adjusting comprises leveling components of a system that includes the energy-generating unit and the anchor.

11. A method according to claim 7, wherein the energy-generating unit is tethered to the anchor using at least one anchor cable, and further comprising a step of pumping air into the energy-generating unit after the anchor reaches the bottom of the water so as to pull the at least one anchor cable taut, thereby stabilizing a system that includes the energy-generating unit and the anchor.

12. A method according to claim 7, wherein the main housing includes a rudder, whereby when the main housing and attached rotating member are disposed in a water current, the rudder automatically adjusts a position of the main housing so that the rotating member is directly facing the water current.

13. A method according to claim 7, wherein the rotating member comprises a paddlewheel that is horizontally oriented when in use.

14. A method according to claim 7, further comprising steps of:

attaching a second energy-generating unit that includes a second housing and a second rotating member to the energy-generating unit; and releasing air from, and thereby sinking, the second energy-generating unit, wherein upon completion of sinking the second energy-generating unit, the second energy-generating unit is submerged underwater and movably tethered to the energy-generating unit, and wherein the second energy-generating unit has variable buoyancy, permitting sinking and then refloating as desired.

15. A method according to claim 7, wherein an underwater hydrogen-production unit receives electricity from the energy-generating unit and uses the electricity to remove hydrogen from surrounding water.

16. A method according to claim 15, wherein an underwater transport/storage barge receives the hydrogen from the hydrogen-production unit and stores the hydrogen.

17. A method according to claim 16, further comprising steps of:

re-floating the transport/storage barge;

disconnecting the transport/storage barge from the hydrogen-production unit after the transport/storage barge has been re-floated and connecting a replacement transport/storage barge to the hydrogen-production unit;

sinking the replacement transport/storage barge; and towing away the transport/storage barge.

18. A method according to claim 7, wherein said attaching step is performed prior to said towing step.

19. A method according to claim 7, wherein each of the main housing and the anchor is made of concrete.

\* \* \* \* \*